(12) United States Patent
Liu et al.

(10) Patent No.: US 12,607,539 B2
(45) Date of Patent: Apr. 21, 2026

(54) DEVICE FOR DETECTING OPTICAL LOSS

(71) Applicant: MSSCORPS CO., LTD., Hsinchu City (TW)

(72) Inventors: Chi-Lun Liu, Hsinchu City (TW); Hsueh-Liang Chou, Hsinchu City (TW); Tsung-Yu Lee, Hsinchu City (TW)

(73) Assignee: MSSCORPS Co., Ltd., Hsinchu City (TW)

( * ) Notice: Subject to any disclaimer, the term of this patent is extended or adjusted under 35 U.S.C. 154(b) by 149 days.

(21) Appl. No.: 18/401,985

(22) Filed: Jan. 2, 2024

(65) Prior Publication Data

US 2025/0076151 A1 Mar. 6, 2025

(30) Foreign Application Priority Data

Sep. 6, 2023 (TW) ................................. 112133805

(51) Int. Cl.
*G01M 11/02* (2006.01)
*G01M 11/00* (2006.01)
(52) U.S. Cl.
CPC ...... *G01M 11/0214* (2013.01); *G01M 11/331* (2013.01)
(58) Field of Classification Search
CPC ........... G01M 11/0214; G01M 11/331; G01M 11/33; G01M 11/0207; G01M 11/30;
(Continued)

(56) References Cited

U.S. PATENT DOCUMENTS 5,655,041 A * 8/1997 Forrest ..................... G02B 6/30
372/50.1
6,469,529 B1 * 10/2002 Bruce .................. G01R 31/311
324/754.23
(Continued)

FOREIGN PATENT DOCUMENTS

CA 2844684 C * 10/2019 ............ A61M 39/26
CN 1086018 A 4/1994
(Continued)

OTHER PUBLICATIONS

Office Action mailed to Corresponding Taiwanese Patent Application No. 112133805 dated Jul. 2, 2024.
(Continued)

*Primary Examiner* — Mohamed K Amara
(74) *Attorney, Agent, or Firm* — Rosenberg, Klein & Lee

(57) ABSTRACT

A device for detecting optical loss includes a first light-guiding cable, a second light-guiding cable, a light detector, at least one angle-adjusting bracket, and a first emission microscope. The first light-guiding cable is connected with a light generator. The light detector is connected with the second light-guiding cable. When the light generator generates a light beam, the light beam is emitted to a semiconductor light-guiding chip through the first light-guiding cable. The semiconductor light-guiding chip guides the light beam to the second light-guiding cable. The light detector receives the light beam through the second light-guiding cable to retrieve the energy of the light beam. The first emission microscope captures the leakage position of the semiconductor light-guiding chip where the light beam is emitted from the semiconductor light-guiding chip.

15 Claims, 6 Drawing Sheets

(58) Field of Classification Search

CPC .... G01M 11/0242; G01R 31/311; G02B 6/30; G02B 7/003

See application file for complete search history.

(56) References Cited

U.S. PATENT DOCUMENTS

| | | | | |
|---|---|---|---|---|
| 7,928,386 B2 * | 4/2011 | Frey | ...................... | G02B 6/1226 |
| | | | | 250/336.2 |
| 9,083,457 B1 | 7/2015 | Wach | | |
| 11,340,401 B2 * | 5/2022 | Maeda | ...................... | G02B 6/30 |
| 2023/0213703 A1 * | 7/2023 | Nesic | ................... | G02B 6/2773 |
| | | | | 385/24 |
| 2025/0076151 A1 * | 3/2025 | Liu | ....................... | G01M 11/331 |

FOREIGN PATENT DOCUMENTS

| | | | | | |
|---|---|---|---|---|---|
| CN | 103226057 | B | | 4/2015 | |
| CN | 103597388 | B * | | 8/2016 | ........... G02B 6/3866 |
| CN | 113702004 | A | | 11/2021 | |
| CN | 110088667 | B | | 5/2023 | |
| CN | 116184646 | A | | 5/2023 | |
| CN | 116539657 | A | | 8/2023 | |
| JP | H04343003 | A | | 11/1992 | |
| JP | H07318750 | A | | 12/1995 | |
| JP | 2823887 | B2 * | 11/1998 | ............... G02B 6/30 |
| JP | 2000055818 | A | | 2/2000 | |
| JP | 2016035536 | A * | 3/2016 | ............ G02B 6/122 |
| JP | 2019095363 | A | | 6/2019 | |
| JP | 2021189130 | A | | 12/2021 | |
| JP | 2022110350 | A | | 7/2022 | |
| TW | 200408834 | A | | 6/2004 | |
| TW | 201400797 | A | | 1/2014 | |
| TW | 202115444 | A | | 4/2021 | |
| TW | 202215733 | A | | 4/2022 | |
| WO | WO-2021204933 | A1 * | 10/2021 | ........... G02B 27/126 |

OTHER PUBLICATIONS

Japanese Examination Report mailed to the Corresponding Patent Application No. 2023-201559 dated Jun. 18, 2024.

Yamada, Yasufumi, et al. "Hybrid-integrated 4* 4 optical gate matrix switch using silica-based optical waveguides and LD array chips." Journal of lightwave technology 10.3 (1992): 383-390.

Search Report mailed to Corresponding European Patent Application No. 23220767.0 dated Jul. 4, 2024.

Examination Report mailed to corresponding Japanese Counterpart Patent Application No. 2023-201559 dated Sep. 3, 2024.

Examination Report mailed to Corresponding Korean Patent Application No. 10-2023-0172813 dated Aug. 26, 2025.

* cited by examiner light
generator

2 electric-parameter
measurement
instrument

7

1

151

15

150 metallographic
microscope image sensor

10

18

13

13'

5

6

4

3

14

14'

19

11

12 light
detector x z y

DEVICE FOR DETECTING OPTICAL LOSS

BACKGROUND OF THE INVENTION

This application claims priority for the TW patent application no. 112133805 filed on 6 Sep. 2023, the content of which is incorporated by reference in its entirely.

FIELD OF THE INVENTION

The invention relates to a detection device, particularly to a device for detecting optical loss.

DESCRIPTION OF THE RELATED ART

In optical cable engineering, it is common to measure the optical loss of objects to be measured such as fiber optic circuits. This is done by using a combination of an optical power meter and a stable light source. A conventional optical loss measurement system includes an optical power meter, a light source, and a control unit. When the light source sends a light signal from one end of the object to be measured, the optical power meter at another end of the object to be measured receives and measures the remaining optical power of the light signal that passes through the object to be measured. The control unit then compares the initial optical power emitted by the light source with the remaining optical power output by the optical power meter to determine the optical transmission loss of the object to be measured.

However, the optical loss measurement system is used to measure higher-power optical transmission losses. Some semiconductor components, such as silicon photonic integrated circuits, generate lower-power optical transmission losses during the light guiding process. However, there is no device used to measure these components. The light leakage position of the silicon photonic integrated circuit is also not detected by any device. The silicon photonic integrated circuit is technology that manufactures photonic components using silicon processes. It integrates photonic electronic components such as optical fibers, optical amplifiers, optical modulators, etc., and electronic components such as transistors, capacitors, inductors, etc., into the same chip, thereby achieving efficient conversion between light and electricity.

To overcome the abovementioned problems, the invention provides a device for detecting optical loss, so as to solve the afore-mentioned problems of the prior art.

SUMMARY OF THE INVENTION

The invention provides a device for detecting optical loss, which detects the abnormal phenomenon of the light-guiding channel of a semiconductor light-guiding chip.

In an embodiment of the invention, the device for detecting optical loss includes a first light-guiding cable, a second light-guiding cable, a light detector, at least one angle-adjusting bracket, and a first emission microscope. The first light-guiding cable has a first end and a second end. The first end of the first light-guiding cable is connected with a light generator. The second light-guiding cable has a third end and a fourth end. The light detector is connected with the fourth end of the second light-guiding cable. The angle-adjusting bracket is provided with the second end of the first light-guiding cable and the third end of the second light-guiding cable and configured to respectively adjust the second end of the first light-guiding cable and the third end of the second light-guiding cable to face toward a semiconductor light-guiding chip. The image-capturing surface of the first emission microscope faces toward the semiconductor light-guiding chip. When the light generator generates a light beam, the light beam is emitted to the semiconductor light-guiding chip through the first light-guiding cable. The semiconductor light-guiding chip guides the light beam to the second light-guiding cable. The light detector receives the light beam through the second light-guiding cable to retrieve the energy of the light beam. The first emission microscope captures the leakage position of the semiconductor light-guiding chip where the light beam is emitted from the semiconductor light-guiding chip.

In an embodiment of the invention, the at least one angle-adjusting bracket includes a first angle-adjusting bracket and a second angle-adjusting bracket. The first angle-adjusting bracket and the second angle-adjusting bracket are respectively provided with the second end of the first light-guiding cable and the third end of the second light-guiding cable and configured to respectively adjust the second end of the first light-guiding cable and the third end of the second light-guiding cable to face toward the semiconductor light-guiding chip.

In an embodiment of the invention, the first angle-adjusting bracket and the second angle-adjusting bracket are three-dimensional (3D) angle-adjusting brackets.

In an embodiment of the invention, the 3D angle-adjusting brackets are automatic three-dimensional (3D) angle-adjusting brackets.

In an embodiment of the invention, the device for detecting optical loss further includes at least one computer host electrically connected to the automatic 3D angle-adjusting brackets and configured to control the automatic 3D angle-adjusting brackets to adjust angles of the second end of the first light-guiding cable and the third end of the second light-guiding cable with respect to the semiconductor light-guiding chip.

In an embodiment of the invention, the computer host electrically connected to the light generator, the light detector, and the first emission microscope and configured to compute the optical-loss energy of the light beam corresponding to the leakage position.

In an embodiment of the invention, the first emission microscope includes an image sensor and a metallographic microscope connected to the image sensor.

In an embodiment of the invention, the semiconductor light-guiding chip includes a silicon on insulator (SOI) substrate and one or a combination of an optical waveguide, a directional coupler, a Mach-Zehnder interferometer, a ring resonator, a grating coupler, an edge coupler, an optical modulator, a photodetector, and a laser diode on the SOI substrate.

In an embodiment of the invention, the device for detecting optical loss further includes a platform that supports the semiconductor light-guiding chip.

In an embodiment of the invention, the first light-guiding cable and the second light-guiding cable are optic fibers.

In an embodiment of the invention, the light generator is a laser generator and the light beam is a laser beam.

In an embodiment of the invention, the device for detecting optical loss further includes a first mounting base and a second mounting base. The first mounting base has a first outer mounting surface and second outer mounting surface opposite to each other. The first angle-adjusting bracket is fixed to the first outer mounting surface of the first mounting base. The second mounting base has a third outer mounting surface and fourth outer mounting surface opposite to each other. The second angle-adjusting bracket is fixed to the third outer mounting surface of the second mounting base.

In an embodiment of the invention, the semiconductor light-guiding chip is a semiconductor photoelectric conversion chip.

In an embodiment of the invention, the semiconductor photoelectric conversion chip is electrically connected to an electric-parameter measurement instrument through a first electric wire and a second electric wire. The electric-parameter measurement instrument is configured to measure electric parameters of the semiconductor photoelectric conversion chip.

In an embodiment of the invention, the at least one angle-adjusting bracket further includes a third angle-adjusting bracket and a fourth angle-adjusting bracket. The third angle-adjusting bracket is fixed to the second outer mounting surface of the first mounting base. The fourth angle-adjusting bracket is fixed to the fourth outer mounting surface of the second mounting base. The third angle-adjusting bracket and the fourth angle-adjusting bracket are respectively provided with the first electric wire and the second electric wire.

In an embodiment of the invention, the third angle-adjusting bracket and the fourth angle-adjusting bracket are three-dimensional (3D) angle-adjusting brackets.

In an embodiment of the invention, the device for detecting optical loss further includes a second emission microscope whose image-capturing surface faces toward the semiconductor light-guiding chip. When the semiconductor photoelectric conversion chip performs photoelectric conversion on the light beam, the second emission microscope captures the leakage position of the semiconductor photoelectric conversion chip where the light beam is emitted from the semiconductor photoelectric conversion chip.

In an embodiment of the invention, the second emission microscope includes an image sensor and a metallographic microscope connected to the image sensor.

To sum up, the device for detecting optical loss employs the light detector to retrieve the energy of the light beam that passes through the semiconductor light-guiding chip and employs the first emission microscope to capture the leakage position of the semiconductor light-guiding chip where the light beam is emitted from the semiconductor light-guiding chip, thereby detecting the abnormal phenomenon of the light-guiding channel of the semiconductor light-guiding chip.

Below, the embodiments are described in detail in cooperation with the drawings to make easily understood the technical contents, characteristics and accomplishments of the invention.

DETAILED DESCRIPTION OF THE INVENTION

Figure 1:
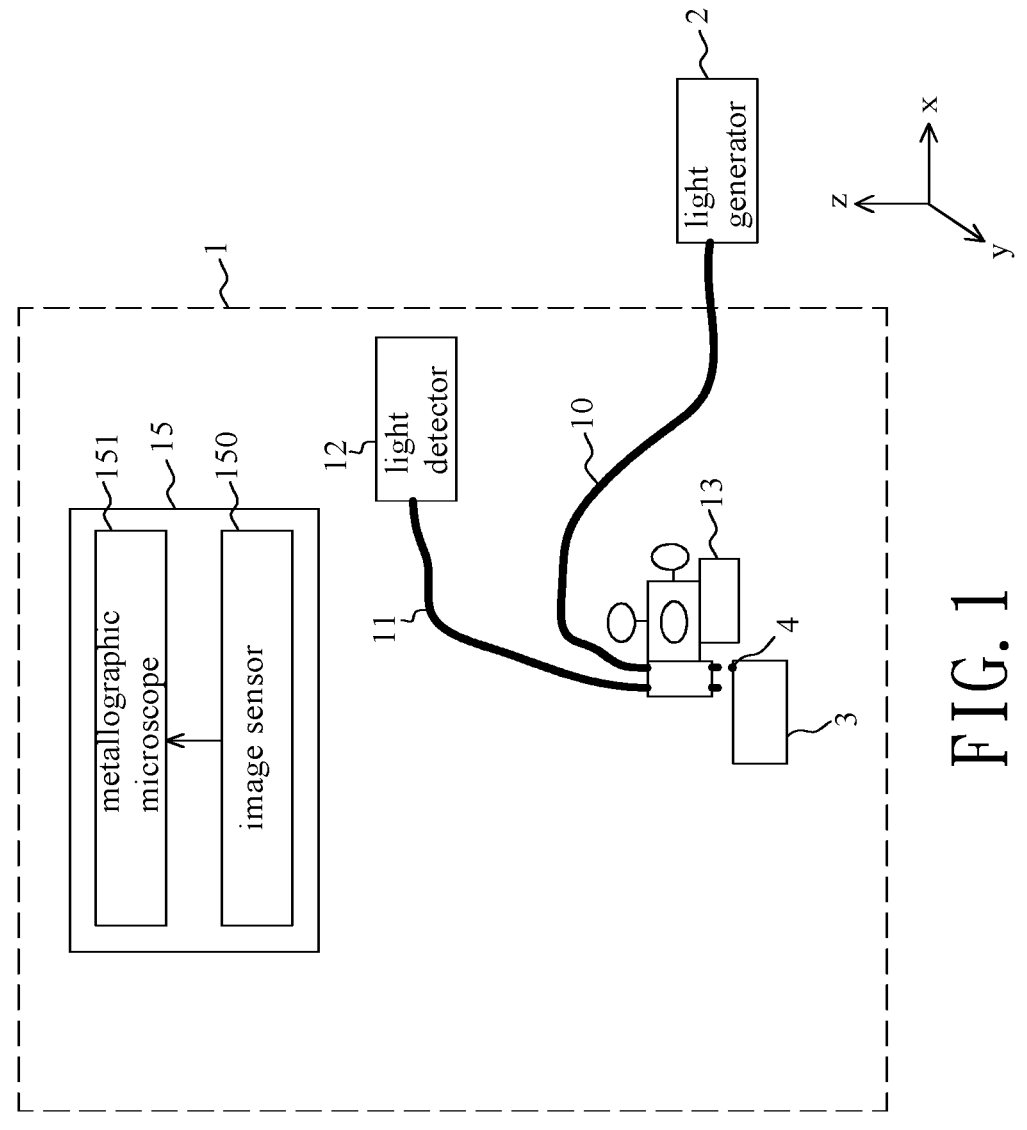
FIG. 1 is a diagram schematically illustrating a device for detecting optical loss according to a first embodiment of the invention.

Reference will now be made in detail to embodiments illustrated in the accompanying drawings. Wherever possible, the same reference numbers are used in the drawings and the description to refer to the same or like parts. In the drawings, the shape and thickness may be exaggerated for clarity and convenience. This description will be directed in particular to elements forming part of, or cooperating more directly with, methods and apparatus in accordance with the present disclosure. It is to be understood that elements not specifically shown or described may take various forms well known to those skilled in the art. Many alternatives and modifications will be apparent to those skilled in the art, once informed by the present disclosure.

Unless otherwise specified, some conditional sentences or words, such as "can", "could", "might", or "may", usually attempt to express what the embodiment in the invention has, but it can also be interpreted as a feature, element, or step that may not be needed. In other embodiments, these features, elements, or steps may not be required.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Certain terms are used throughout the description and the claims to refer to particular components. One skilled in the art appreciates that a component may be referred to using different names. This disclosure does not intend to distinguish between components that differ in name but not in function. In the description and in the claims, the term "comprise" is used in an open-ended fashion, and thus should be interpreted to mean "include, but not limited to." The phrases "be coupled to," "couples to," and "coupling to" are intended to encompass any indirect or direct connection. Accordingly, if this disclosure mentions that a first device is coupled with a second device, it means that the first device may be directly or indirectly coupled to the second device through electrical connections, wireless communications, optical communications, or other signal connections with/without other intermediate devices or connection means.

The invention is particularly described with the following examples which are only for instance. Those skilled in the art will readily observe that numerous modifications and alterations of the device and method may be made while retaining the teachings of the invention. Accordingly, the following disclosure should be construed as limited only by the metes and bounds of the appended claims. In the whole patent application and the claims, except for clearly described content, the meaning of the articles "a" and "the" includes the meaning of "one or at least one" of the elements or components. Moreover, in the whole patent application and the claims, except that the plurality can be excluded obviously according to the context, the singular articles also contain the description for the plurality of elements or components. In the entire specification and claims, unless the contents clearly specify the meaning of some terms, the meaning of the article "wherein" includes the meaning of the articles "wherein" and "whereon". The meanings of every term used in the present claims and specification refer to a usual meaning known to one skilled in the art unless the meaning is additionally annotated. Some terms used to describe the invention will be discussed to guide practitioners about the invention. The examples in the present specification do not limit the claimed scope of the invention.

A device for detecting optical loss will be introduced as follows. The device for detecting optical loss employs a light detector to retrieve the energy of a light beam that passes through a semiconductor light-guiding chip and employs a first emission microscope to capture the leakage position of the semiconductor light-guiding chip where the light beam is emitted from the semiconductor light-guiding chip, thereby detecting the abnormal phenomenon of the light-guiding channel of the semiconductor light-guiding chip.

FIG. 1 is a diagram schematically illustrating a device for detecting optical loss according to a first embodiment of the invention. Referring to FIG. 1, a first embodiment of a device 1 for detecting optical loss is introduced as follows. The device 1 for detecting optical loss includes a first light-guiding cable 10, a second light-guiding cable 11, a light detector 12, at least one angle-adjusting bracket including a first angle-adjusting bracket 13, and a first emission microscope 15. The first embodiment is exemplified by one angle-adjusting bracket. The first light-guiding cable 10 and the second light-guiding cable 11 may be, but not limited to, optic fibers. The first light-guiding cable 10 has a first end and a second end, wherein the first end of the first light-guiding cable 10 is connected with a light generator 2. The second light-guiding cable 11 has a third end and a fourth end. The light detector 12 is connected with the fourth end of the second light-guiding cable 11. The first angle-adjusting bracket 13 is provided with the second end of the first light-guiding cable 10 and the third end of the second light-guiding cable 11. The first angle-adjusting bracket 13 respectively adjusts the second end of the first light-guiding cable 10 and the third end of the second light-guiding cable 11 to face toward a semiconductor light-guiding chip 3. The first angle-adjusting bracket 13 may be a three-dimensional (3D) angle-adjusting bracket, but the invention is not limited thereto. When the first angle-adjusting bracket 13 is a three-dimensional (3D) angle-adjusting bracket, the first angle-adjusting bracket 13 may adjust the second end of the first light-guiding cable 10 and the third end of the second light-guiding cable 11 to rotate on a xy plane, an yz plane, or a zx plane. The image-capturing surface of the first emission microscope 15 faces toward the semiconductor light-guiding chip 3.

When the light generator 2 generates a light beam, the light beam is emitted to the semiconductor light-guiding chip 3 through the first light-guiding cable 10 such that there is a light spot 4 on the semiconductor light-guiding chip 3. The semiconductor light-guiding chip 3 guides the light beam to the second light-guiding cable 11. The light detector 12 receives the light beam through the second light-guiding cable 11 to retrieve the energy of the light beam. Also, the first emission microscope 15 captures the leakage position of the semiconductor light-guiding chip 3 where the light beam is emitted from the semiconductor light-guiding chip 3, thereby detecting the abnormal phenomenon of the light-guiding channel of the semiconductor light-guiding chip 3.

The light beam may be designed to have a wavelength of 100-6000 nm. The light generator 2 may be a laser generator, but the invention is not limited thereto. When the light generator 2 is a laser generator, the light beam is a laser beam. The different light-guiding channels of the semiconductor light-guiding chip 3 are respectively used for light beams with different optical properties. For example, the optical properties include power, incident angle, scattering, oscillation, amplitude, refraction, reflection, polarization, etc. After the light generator 2 corrects the optical property of the light beam, the specific light-guiding channel of the semiconductor light-guiding chip 3 generates a light beam with a specific optical property to detect the abnormal phenomena of the specific light-guiding channel.

In some embodiments of the invention, the first emission microscope 15 includes an image sensor 150 and a metallographic microscope 151 connected to the image sensor 150. The image sensor 150 may be a charge-coupled device that includes photosensitive areas, an output amplifier, and a storage area. The photosensitive areas are electrically connected to the output amplifier. The output amplifier is electrically connected to the storage area. The photosensitive area of the image sensor 150 may include InGaAs, Si, InSb, HgCdTe, or 2,5-dimercapto-1,3,4-thiadiazole (DMCT). The photosensitive area is mainly used to receive invisible light, such as infrared or far-infrared light. The photosensitive area can alternatively receive visible light. The photosensitive area is typically in the form of a thin film and is placed on the top of a silicon substrate. When the light beam is emitted from the semiconductor light-guiding chip 3, the image sensor 150 captures the infrared light generated due to the defects of the semiconductor light-guiding chip 3. The output amplifier, which is a transistor or a metal-oxide-semiconductor field-effect transistor (MOSFET), is responsible for converting the charge received by the photosensitive area into a voltage signal. The output amplifier is usually placed at the edge of the silicon substrate. The storage area is mainly responsible for storing the voltage signal converted by the output amplifier. The storage area is typically made of metal or polycrystalline silicon and is placed on the silicon substrate. In addition, the metallographic microscope 151 is a high-magnification microscope used to magnify the light leakage positions captured by the image sensor 150.

Figure 2:
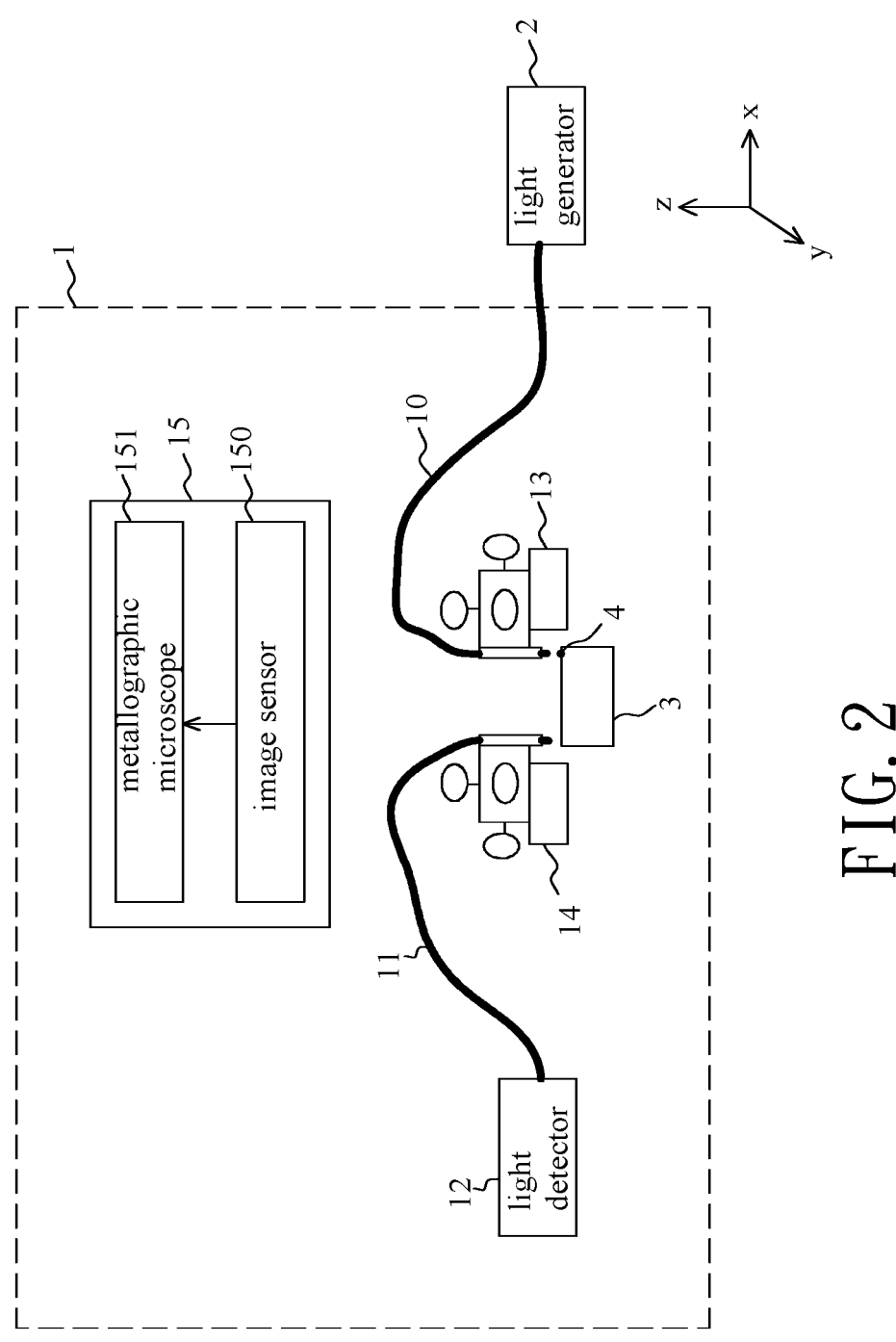
FIG. 2 is a diagram schematically illustrating a device for detecting optical loss according to a second embodiment of the invention.

FIG. 2 is a diagram schematically illustrating a device for detecting optical loss according to a second embodiment of the invention. Referring to FIG. 2, a second embodiment of a device 1 for detecting optical loss is introduced as follows. The second embodiment is different from the first embodiment in that the second embodiment has two angle-adjusting brackets that include a first angle-adjusting bracket 13 and a second angle-adjusting bracket 14. The first angle-adjusting bracket 13 and the second angle-adjusting bracket 14 are respectively provided with the second end of the first light-guiding cable 10 and the third end of the second light-guiding cable 11 and configured to respectively adjust the second end of the first light-guiding cable 10 and the third end of the second light-guiding cable 11 to face toward the semiconductor light-guiding chip 3. The second angle-adjusting bracket 14 may be a three-dimensional (3D) angle-adjusting bracket, but the invention is not limited thereto. When the first angle-adjusting bracket 13 and the second angle-adjusting bracket 14 are 3D angle-adjusting brackets, the first angle-adjusting bracket 13 and the second angle-adjusting bracket 14 respectively adjust the second end of the first light-guiding cable 10 and the third end of the second light-guiding cable 11 to rotate on a xy plane, an yz plane, or a zx plane. The other features pf the second embodiment have been introduced in the first embodiment so they will not be reiterated.

Figure 3:
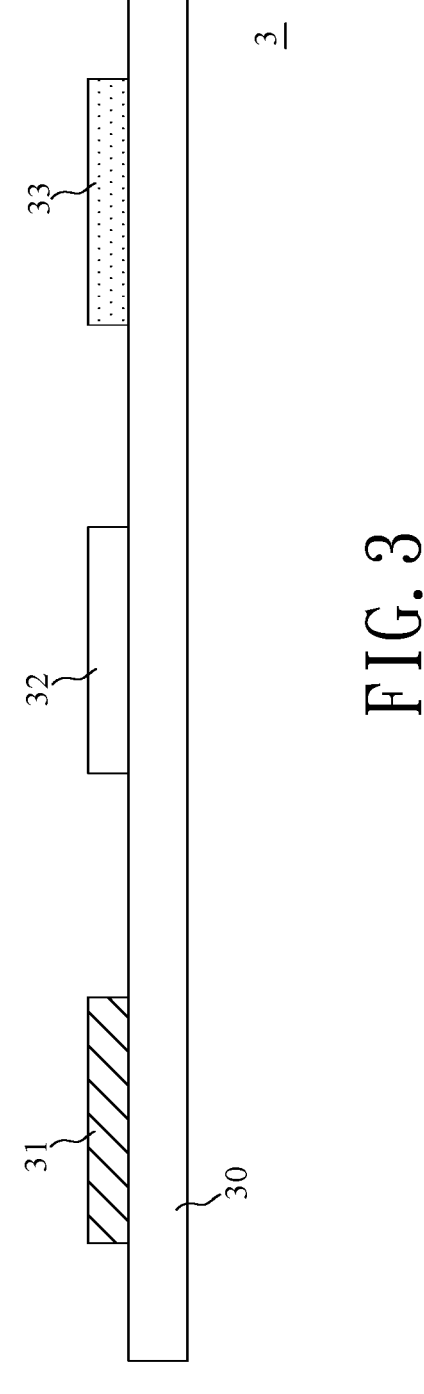
FIG. 3 is a cross-sectional view of a semiconductor light-guiding chip according to an embodiment of the invention.

FIG. 3 is a cross-sectional view of a semiconductor light-guiding chip according to an embodiment of the invention. Please refer to FIG. 3. The semiconductor light-guiding chip 3 can be a silicon photonics integrated circuit (SiPh IC), but the invention is not limited thereto. A SiPh IC is an integrated circuit that manufactures photonic components using silicon or semiconductor processes. It integrates optical electronic components and electronic components in the same chip, thereby achieving high-efficiency conversion between light and electricity. The optical electronic components may be optical fibers, optical amplifiers, optical modulators, or a combination of these. The electronic components may be transistors, capacitors, inductors, or a combination of these. For example, the semiconductor light-guiding chip 3 includes a silicon on insulator (SOI) substrate 30 and at least one optical component thereon. This at least one optical component includes at least one passive optical component 31 and at least one active optical component 32. The passive optical component 31 can be an optical waveguide, a directional coupler, a Mach-Zehnder interferometer, a ring resonator, a grating coupler, or an edge coupler. The active optical component 32 can be a light modulator, a light detector, or a laser diode. In other words, at least one optical component can include at least one or a combination of optical waveguides, directional couplers, Mach-Zehnder interferometers, ring resonators, grating couplers, edge couplers, optical modulators, photodetectors, and laser diodes. In some embodiments, the semiconductor light-guiding chip 3 can be a semiconductor optoelectronic conversion chip, which may further include at least one electronic component 33 on the SOI substrate 30, such as a transimpedance amplifier, an application specific integrated circuit (ASIC), or a driver integrated circuit.

Figure 4:
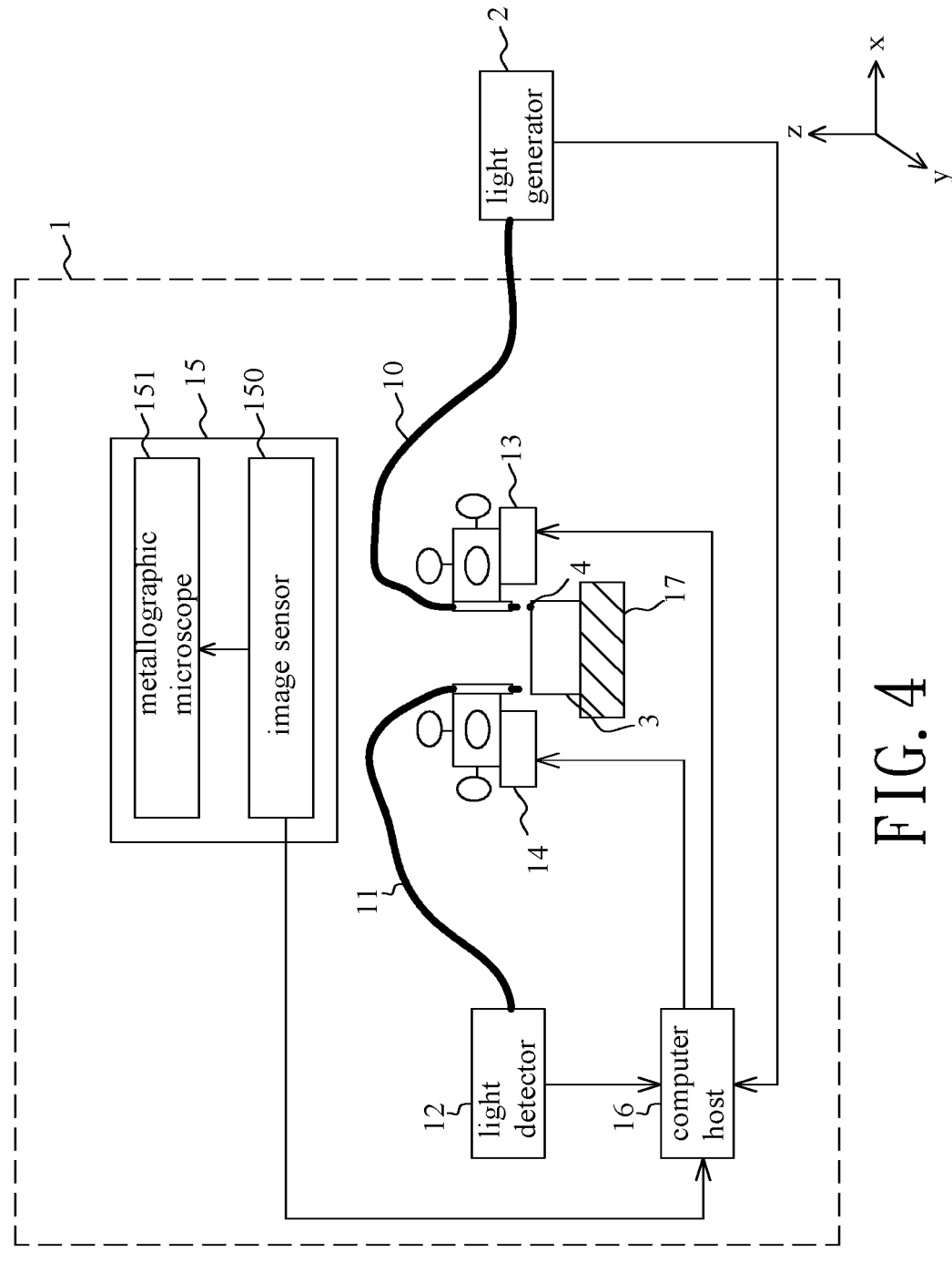
FIG. 4 is a diagram schematically illustrating a device for detecting optical loss according to a third embodiment of the invention.
Figure 5:
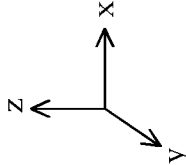
FIG. 5 is a diagram schematically illustrating a device for detecting optical loss according to a fourth embodiment of the invention.

FIG. 4 is a diagram schematically illustrating a device for detecting optical loss according to a third embodiment of the invention. Referring to FIG. 4, a third embodiment of a device 1 for detecting optical loss is introduced as follows. The third embodiment is different from the second embodiment in that the third embodiment further includes at least one computer host 16 and a platform 17. The platform 17 supports the semiconductor light-guiding chip 3. In the third embodiment, the first angle-adjusting bracket 13 and the second angle-adjusting bracket 14 are automatic three-dimensional (3D) angle-adjusting brackets. The number of the computer host 16 is adaptable according to requirements. For convenience and clarity, the third embodiment exemplifies one computer host 16. The computer host 16, electrically connected to the automatic 3D angle-adjusting brackets, controls them to adjust the angles of the second end of the first light-guiding cable 10 and the third end of the second light-guiding cable 11 with respect to the semiconductor light-guiding chip 3. In some embodiments, the computer host 16 may be electrically connected to a light generator 2, the light detector 12, and the image sensor 150 of the first emission microscope 15. The computer host 16 retrieves the total energy of the light beam from the light generator 2 and retrieves the remaining energy of the light beam from the light detector 12. Based on the total energy and the remaining energy of the light beam, the computer host 16 computes the optical-loss energy corresponding to the leakage position of the semiconductor light-guiding chip 3 where the light beam is emitted from the semiconductor light-guiding chip 3. FIG. 5 is a diagram schematically illustrating a device for detecting optical loss according to a fourth embodiment of the invention. Referring to FIG. 5, a fourth embodiment of the device 1 for detecting optical loss is introduced as follows. Compared with the second embodiment, the fourth embodiment further includes a first mounting base 18, a second mounting base 19, a third angle-adjusting bracket 13' and a fourth angle-adjusting bracket 14'. In addition, the semiconductor light-guiding chip is implemented with a semiconductor photoelectric conversion chip. The first mounting base 18 has a first outer mounting surface and a second outer mounting surface opposite to each other. The first angle-adjusting bracket 13 is fixed to the first outer mounting surface of the first mounting base 18. The second mounting base 19 has a third outer mounting surface and fourth outer mounting surface opposite to each other. The second angle-adjusting bracket 14 is fixed to the third outer mounting surface of the second mounting base 19. The semiconductor photoelectric conversion chip is electrically connected to an electric-parameter measurement instrument 7 through a first electric wire 5 and a second electric wire 6. The electric-parameter measurement instrument 7 measures the electric parameters of the semiconductor photoelectric conversion chip, such as voltages and currents. The third angle-adjusting bracket 13' is fixed to the second outer mounting surface of the first mounting base 18. The fourth angle-adjusting bracket 14' is fixed to the fourth outer mounting surface of the second mounting base 19. The third angle-adjusting bracket 13' and the fourth angle-adjusting bracket 14' are respectively provided with the first electric wire 5 and the second electric wire 6. In some embodiments of the invention, the third angle-adjusting bracket 13' and the fourth angle-adjusting bracket 14' are 3D angle-adjusting brackets. When the third angle-adjusting bracket 13' and the fourth angle-adjusting bracket 14' are 3D angle-adjusting brackets, the third angle-adjusting bracket 13' and the fourth angle-adjusting bracket 14' may respectively adjust the first electric wire 5 and the second electric wire 6 to rotate on a xy plane, an yz plane, or a zx plane.

Figure 6:
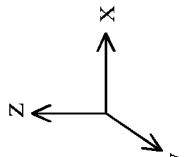
FIG. 6 is a diagram schematically illustrating a device for detecting optical loss according to a fifth embodiment of the invention.

FIG. 6 is a diagram schematically illustrating a device for detecting optical loss according to a fifth embodiment of the invention. Referring to FIG. 6, a fifth embodiment of the device 1 for detecting optical loss is introduced as follows. The fifth embodiment is different from the fourth embodiment in that the fifth embodiment further includes a second emission microscope 15' whose image-capturing surface faces toward the semiconductor photoelectric conversion chip. When the semiconductor photoelectric conversion chip performs photoelectric conversion on the light beam, the second emission microscope 15' captures the leakage position of the semiconductor photoelectric conversion chip where the light beam is emitted from the semiconductor photoelectric conversion chip. The second emission microscope 15' may include an image sensor 150' and a metallographic microscope 151' connected to the image sensor 150'. The image sensor 150' may be a charge-coupled device that includes photosensitive areas, an output amplifier, and a storage area. The photosensitive areas are electrically connected to the output amplifier. The output amplifier is electrically connected to the storage area. The photosensitive area of the image sensor 150' may include InGaAs, Si, InSb, HgCdTe, or 2,5-dimercapto-1,3,4-thiadiazole (DMCT). The photosensitive area is mainly used to receive invisible light, such as infrared or far-infrared light. The photosensitive area can alternatively receive visible light. The photosensitive area is typically in the form of a thin film and is placed on the top of a silicon substrate. When the light beam is emitted from the semiconductor photoelectric conversion chip, the image sensor 150' captures the infrared light generated due to the defects of the semiconductor photoelectric conversion chip. The output amplifier, which is a transistor or a metal-oxide-semiconductor field-effect transistor (MOSFET), is responsible for converting the charge received by the photosensitive area into a voltage signal. The output amplifier is usually placed at the edge of the silicon substrate. The storage area is mainly responsible for storing the voltage signal converted by the output amplifier. The storage area is typically made of metal or polycrystalline silicon and is placed on the silicon substrate. In addition, the metallographic microscope 151' is a high-magnification microscope used to magnify the light leakage positions captured by the image sensor 150'.

According to the embodiments provided above, the device for detecting optical loss employs the light detector to retrieve the energy of the light beam that passes through the semiconductor light-guiding chip and employs the first emission microscope to capture the leakage position of the semiconductor light-guiding chip where the light beam is emitted from the semiconductor light-guiding chip, thereby detecting the abnormal phenomenon of the light-guiding channel of the semiconductor light-guiding chip.

The embodiments described above are only to exemplify the invention and not to limit the scope of the invention. Therefore, any equivalent modification or variation according to the shapes, structures, features, or spirit disclosed by the invention is to be also included within the scope of the invention.

What is claimed is:

1. A device for detecting optical loss, comprising:
a first light-guiding cable having a first end and a second end, wherein the first end of the first light-guiding cable is connected with a light generator;
a second light-guiding cable having a third end and a fourth end;
a light detector connected with the fourth end of the second light-guiding cable;
at least one angle-adjusting bracket provided with the second end of the first light-guiding cable and the third end of the second light-guiding cable and configured to respectively adjust the second end of the first light-guiding cable and the third end of the second light-guiding cable to face toward a semiconductor light-guiding chip;
a first emission microscope whose image-capturing surface faces toward the semiconductor light-guiding chip, wherein the light generator emits a light beam to the semiconductor light-guiding chip through the first light-guiding cable, the semiconductor light-guiding chip guides the light beam to the second light-guiding cable, the light detector receives the light beam through the second light-guiding cable to retrieve energy of the light beam, and the first emission microscope captures a leakage position of the semiconductor light-guiding chip where the light beam is emitted from the semiconductor light-guiding chip; and
at least one computer host electrically connected to the light generator, the light detector, and the first emission microscope and configured to compute optical-loss energy of the light beam corresponding to the leakage position;
wherein the light generator is a laser generator and the light beam is a laser beam;
wherein the first emission microscope comprises an image sensor and a metallographic microscope connected to the image sensor, and the metallographic microscope is configured to magnify the leakage position captured by the image sensor.

2. The device for detecting optical loss according to claim 1, wherein the at least one angle-adjusting bracket comprises a first angle-adjusting bracket and a second angle-adjusting bracket, and the first angle-adjusting bracket and the second angle-adjusting bracket are respectively provided with the second end of the first light-guiding cable and the third end of the second light-guiding cable and configured to respectively adjust the second end of the first light-guiding cable and the third end of the second light-guiding cable to face toward the semiconductor light-guiding chip.

3. The device for detecting optical loss according to claim 2, wherein the first angle-adjusting bracket and the second angle-adjusting bracket are three-dimensional (3D) angle-adjusting brackets.

4. The device for detecting optical loss according to claim 3, wherein the 3D angle-adjusting brackets are automatic three-dimensional (3D) angle-adjusting brackets.

5. The device for detecting optical loss according to claim 4, wherein the at least one computer host electrically connected to the automatic 3D angle-adjusting brackets and configured to control the automatic 3D angle-adjusting brackets to adjust angles of the second end of the first light-guiding cable and the third end of the second light-guiding cable with respect to the semiconductor light-guiding chip.

6. The device for detecting optical loss according to claim 2, further comprising:
a first mounting base having a first outer mounting surface and second outer mounting surface opposite to each other, wherein the first angle-adjusting bracket is fixed to the first outer mounting surface of the first mounting base; and
a second mounting base having a third outer mounting surface and fourth outer mounting surface opposite to each other, wherein the second angle-adjusting bracket is fixed to the third outer mounting surface of the second mounting base.

7. The device for detecting optical loss according to claim 6, wherein the semiconductor light-guiding chip is a semiconductor photoelectric conversion chip.

8. The device for detecting optical loss according to claim 7, wherein the semiconductor photoelectric conversion chip is electrically connected to an electric-parameter measurement instrument through a first electric wire and a second electric wire and the electric-parameter measurement instrument is configured to measure electric parameters of the semiconductor photoelectric conversion chip.

9. The device for detecting optical loss according to claim 8, wherein the at least one angle-adjusting bracket further comprises a third angle-adjusting bracket and a fourth angle-adjusting bracket, the third angle-adjusting bracket is fixed to the second outer mounting surface of the first mounting base, the fourth angle-adjusting bracket is fixed to the fourth outer mounting surface of the second mounting base, and the third angle-adjusting bracket and the fourth angle-adjusting bracket are respectively provided with the first electric wire and the second electric wire.

10. The device for detecting optical loss according to claim 9, wherein the third angle-adjusting bracket and the fourth angle-adjusting bracket are three-dimensional (3D) angle-adjusting brackets.

11. The device for detecting optical loss according to claim 9, further comprising a second emission microscope whose image-capturing surface faces toward the semiconductor light-guiding chip, wherein when the semiconductor photoelectric conversion chip performs photoelectric conversion on the light beam, the second emission microscope captures a leakage position of the semiconductor photoelectric conversion chip where the light beam is emitted from the semiconductor photoelectric conversion chip.

12. The device for detecting optical loss according to claim 11, wherein the second emission microscope comprises an image sensor and a metallographic microscope connected to the image sensor.

13. The device for detecting optical loss according to claim 1, wherein the semiconductor light-guiding chip comprises a silicon on insulator (SOI) substrate and one or a combination of an optical waveguide, a directional coupler, a Mach-Zehnder interferometer, a ring resonator, a grating coupler, an edge coupler, an optical modulator, a photodetector, and a laser diode on the SOI substrate.

14. The device for detecting optical loss according to claim 1, further comprising a platform that supports the semiconductor light-guiding chip.

15. The device for detecting optical loss according to claim 1, wherein the first light-guiding cable and the second light-guiding cable are optic fibers.

* * * * *